Figure 5:
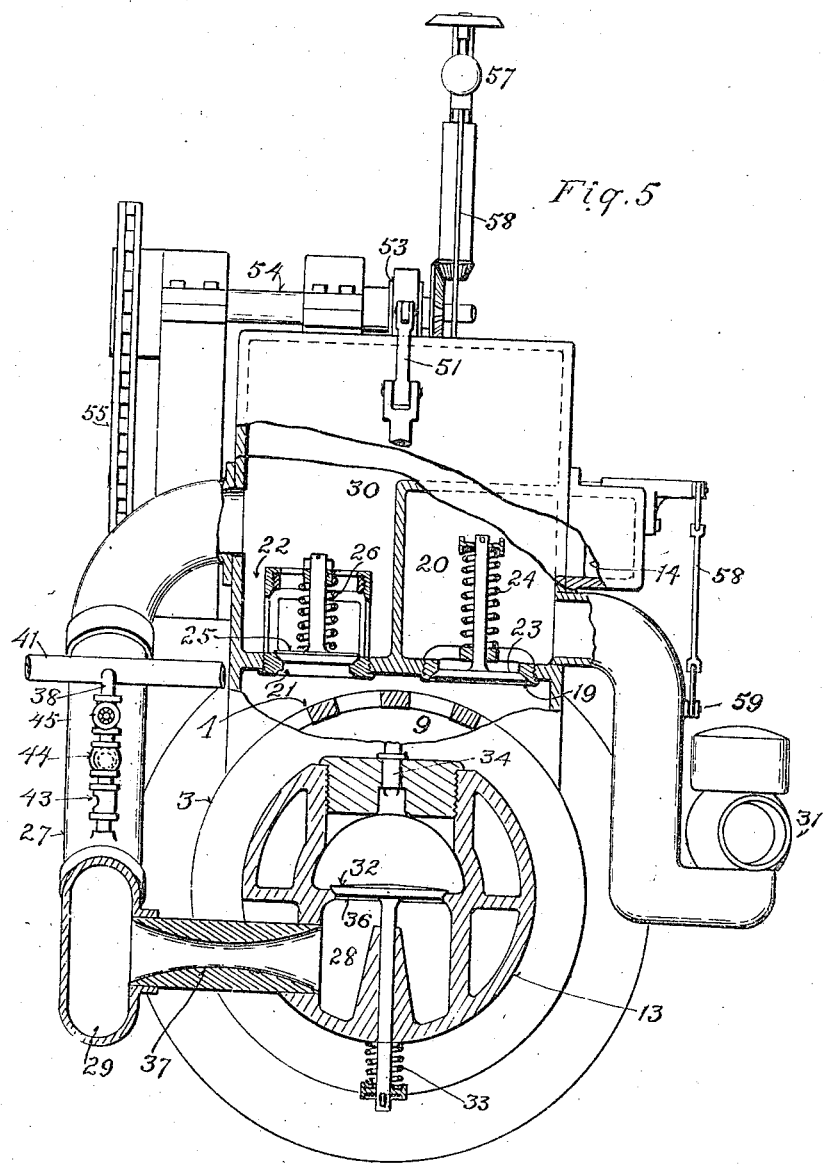

F. J. KIMBALL.
POSITIVE SCAVENGING TWO CYCLE INTERNAL COMBUSTION ENGINE.
APPLICATION FILED JUNE 27, 1914.
1,165,515.
Patented Dec. 28, 1915.
3 SHEETS—SHEET 1.
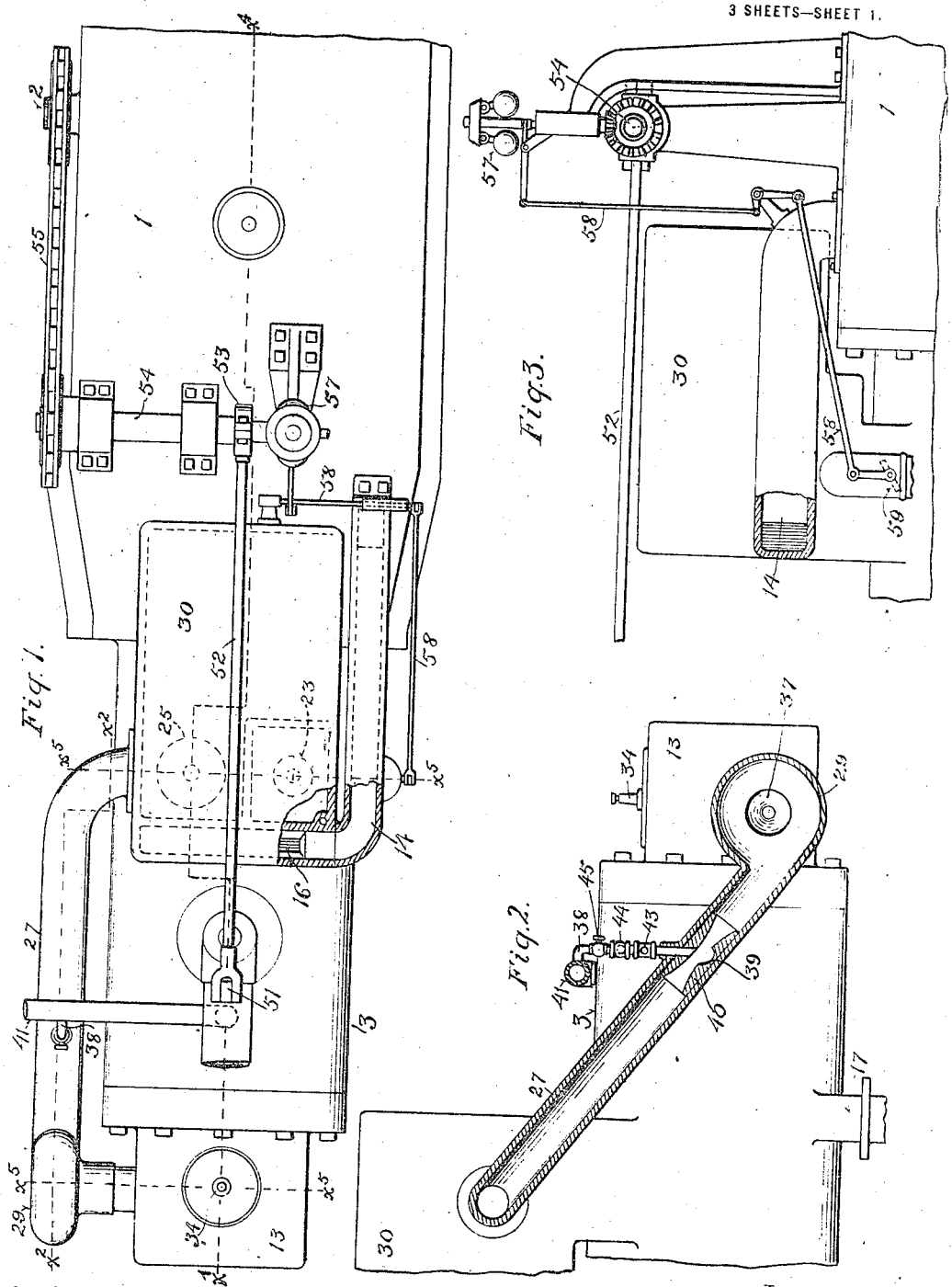
Witnesses:
A. W. Knight
J. Rogers
Inventor:
Frank J. Kimball
by Arthur P. Knight
his Atty

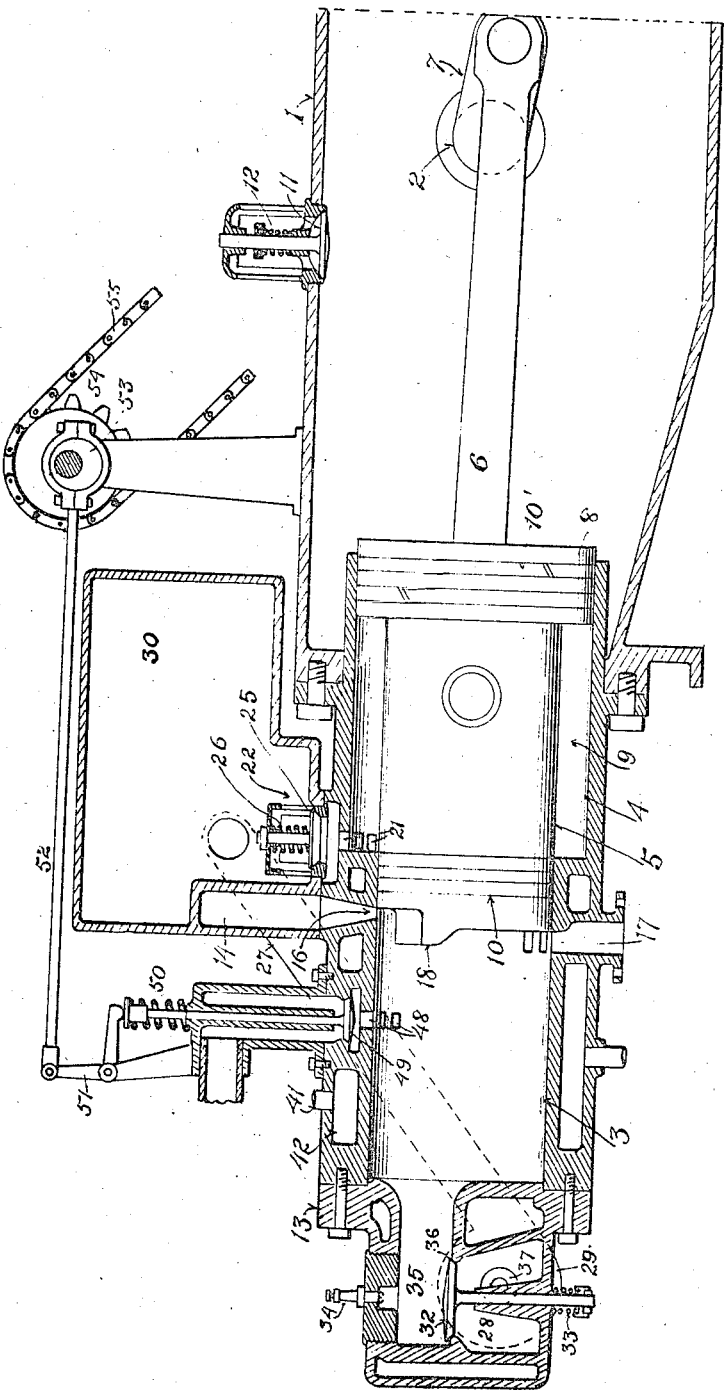

F. J. KIMBALL.
POSITIVE SCAVENGING TWO CYCLE INTERNAL COMBUSTION ENGINE.
APPLICATION FILED JUNE 27, 1914.

1,165,515.

Patented Dec. 28, 1915.

Witnesses:
A. W. Knight
J. Rogers.

Inventor:
Frank J. Kimball
by Arthur P. Knight
his atty

UNITED STATES PATENT OFFICE.

FRANK J. KIMBALL, OF LOS ANGELES, CALIFORNIA.

POSITIVE-SCAVENGING TWO-CYCLE INTERNAL-COMBUSTION ENGINE.

1,165,515.    Specification of Letters Patent.    Patented Dec. 28, 1915.

Application filed June 27, 1914. Serial No. 847,572.

*To all whom it may concern:*

Be it known that I, FRANK J. KIMBALL, a citizen of the United States, residing at Los Angeles, in the county of Los Angeles and State of California, have invented a new and useful Positive-Scavenging Two-Cycle Internal-Combustion Engine, of which the following is a specification.

This invention relates to internal combustion engines of the two-cycle type, and the main object of the invention is to provide for complete and positive scavenging of the cylinder of the engine after each combustion, thereby insuring effective combustion in the next ensuing cycle.

Another object of the invention is to provide a two-cycle engine with means for preliminary scavenging with air, and with means for thereafter supplying a mixture of air and fuel to the cylinder for positive scavenging and charging action.

A further object of the invention is to provide, in an engine of this character, means for postponing or "breaking" the compression by prolonging the period of exhaust, during a part of the compression stroke, thereby enabling the expansion of the burnt gases down to substantially atmospheric pressure, with resulting high economy, and also enabling more effective scavenging of the products of combustion during this period of prolongation of the exhaust.

Another object of the invention is to provide means for supplying water to the partly compressed mixture of fuel and air, so as to keep the temperature of the fully compressed mixture from rising sufficiently to result in premature ignition.

The accompanying drawings illustrate an embodiment of my invention and referring thereto: Figure 1 is a plan view of the engine, partly broken away. Fig. 2 is a longitudinal section, on line $x^2$—$x^2$ in Fig. 1. Fig. 3 is a side elevation, partly broken away. Fig. 4 is a section on line $x^4$—$x^4$ in Fig. 1. Fig. 5 is a section on line $x^5$—$x^5$ in Fig. 1, with parts broken away.

It will be understood that my invention is applicable to an engine having any number of cylinders. In the drawings, it is illustrated as embodied in a single cylinder engine, having a crank case 1, a main shaft 2, journaled on said crank case, and cylinder means mounted on said crank case and comprising a main cylinder 3, and a low pressure cylinder 4, formed as an extension of the main cylinder. A trunk-piston 5 working in said main cylinder, is connected by connecting rod 6 to crank 7 on shaft 2, and said piston is provided with an enlargement, or flange 8, working in the cylinder 4, said cylinder 4 being sufficiently larger than the cylinder 3 and the piston 5, to provide an annular cylinder chamber 9 between the said piston and the wall of cylinder 4. Piston 5 and the piston portion 8 are provided with the usual packing rings 10 and 10'.

I prefer to use crank case compression for a preliminary scavenging of the main cylinder 3, and for this purpose the crank case is provided with an inlet valve 11, normally held closed by a spring 12, and opened automatically, by suction in the crank case, to admit air thereto. The cylinder extension 4 opens into the crank case, so that the piston 5 operates to compress the air in the crank case on its outward stroke. A conduit or pipe 14 leads from the crank case to a scavenging inlet port 16 in the wall of cylinder 3, and said cylinder is provided, opposite said inlet port, with an exhaust port 17, the piston having a deflector 18, for deflecting the scavenging air so as to clear the cylinder more effectively.

The cylinder extension or low pressure cylinder 4 is provided with inlet port 19 opening into inlet valve chamber 20, and with outlet port 21, opening into a valve chamber 22. An inwardly-opening inlet valve 23 is provided for valve port 19, and is normally held closed by a spring 24, and an outwardly opening valve 25 is provided for outlet port 21, and is normally closed by a spring 26. Inlet chamber 20 communicates with fuel and air supply means, for example a carbureter 31, of any suitable type. Outlet valve chamber 22 communicates, through a pipe 27, with a mixing chamber 29, which communicates, through a contracted duct, or " Venturi " tube, 37, with a valve chamber 28 in the head 13 of the cylinder 3. In order to provide sufficient space for storage or retention of a charge of air and fuel, compressed at low pressure by the cylinder 4, until the main cylinder 3 is ready to receive it, the valve chamber may be provided with an extension or storage chamber 30. An inlet valve 32 for main cylinder 3 is provided in the valve chamber 28, and is normally held closed by a spring 33, so as to shut off communication through the port 36, between said valve chamber and the cylinder 3, said spring being set at such tension as to allow the valve to open only when the pressure in the cylinder 3 falls to or below atmospheric pressure, during the opening of the exhaust port. The mixing chamber 29 is preferably circular, the inlet pipe 27 entering the same tangentially and the outlet pipe 37 extending axially from said chamber, so as to produce a vertical whirling motion of the mixture as it passes through said chamber.

Means are preferably provided for supplying moisture to the mixture as it passes through the pipe 27, said means comprising, for example, a water supply tube 38 connected with the piping 41 for the water jacket 42 of the engine, and adapted to feed water gradually to a receptacle 39 in a contracted portion 40 of said pipe. Said water supply pipe may have a sight feed cup 43, check valve 44 and manual valve 45.

Suitable means are provided for igniting the charge, for example a spark plug 34 exposed in a chamber 35 adjacent to the inlet port 36 in the cylinder head, said spark plug being connected to any usual means for producing a spark thereat at the proper moment.

In connection with the engine construction above described I may provide means for "breaking" or postponing the compression, so as to reduce or eliminate the terminal pressure at which the exhaust gases are discharged from the engine. For this purpose a supplementary exhaust port 48 may be provided in the cylinder, in position to be closed by the piston 5, say at about one half stroke, in its movement toward the head end of the cylinder, and an inwardly opening valve 49 is provided for said port, said valve being normally held closed by a spring 50 and being opened during the first portion of this inward stroke of the piston, by suitable means, such as a lever 51, operated through rod 52, by an eccentric 53 on a shaft 54 which is driven from the main shaft 2 of the engine, by chain gearing 55 or otherwise. This shaft 54 may also be used to drive the governor 57 which through lever and rod connections 58 controls a throttle 59 for the carbureter 31.

The operation is as follows: As the piston 5 moves outwardly, that is, away from the cylinder head 13, the piston 8 also moves outwardly and draws a charge of air and fuel through inlet port 19, the valve 23 opening automatically under the suction from the low pressure cylinder chamber 9, and the air being drawn through the carbureter 31 to the valve chamber 20 and thence through port 19 into the cylinder chamber 9. During this movement, also, the piston compresses the air in the crank chamber, so that at the end of this outward stroke, the crank case contains air under low pressure, say about one pound per square inch, and the cylinder chamber 9 contains a charge of air and fuel. As the piston approaches the outer end of its stroke, it passes over the exhaust port 17 and the scavenging inlet port 16, and slightly compressed air then flows from the crank case through pipe 14, port 16, main cylinder 3 and exhaust port 17, thereby effecting a preliminary scavenging of the cylinder. As the piston 8 then moves inward, the charge in the cylinder chamber 9 is thereby compressed, and is forced into the storage chamber 30, the valve 25 opening automatically under the pressure in the cylinder chamber 9. The storage chamber 30 is in this manner charged with a mixture of air and fuel, under low pressure, say about three to five pounds per square inch, this mixture being communicated through pipe 27 to valve chamber 28, and the pressure of the mixture tending to lift the inlet valve 32, which is, however, held closed during this compression stroke by the pressure in cylinder 3, and by the pressure of spring 33; so that the charge is retained in chamber 30 until near the end of the next outward or expansion stroke of piston 5. As the piston opens the ports 16 and 17 in completing its expansion or outward stroke, any pressure which may exist in cylinder 3 is relieved by exhausting of gases through the port 17, and a preliminary scavenging is then effected by blowing of air from the crank case through the ports 16 and 17 as above described. At the moment when the pressure in the cylinder is reduced by opening of port 17, the inlet valve 32 is opened by the pressure of the mixture thereon, there being at this time no back pressure on the inner face of the valve, and a charge of mixture then flows into the cylinder 3, expelling the foul gases remaining in the cylinder, through the exhaust port 17. As the piston starts on its instroke, the supplementary exhaust valve 49 is opened by its operating means above described, and this valve remains open until after the piston 5 passes the port 48, so that in the first part of the instroke of the piston 5, a supplementary exhaust passage is maintained through port 48 and valve 49, permitting a positive scavenging action due to the inflowing of the compressed mixture at low pressure from the storage chamber 30, through the inlet valve 32, this mixture of fuel and air driving the remaining foul gases out through the port 49, until said port is closed by piston 5 passing over it. I prefer to so adjust the tension of the controlling spring 33, with reference to the pressure in the storage chamber 30, that the mixture of fuel and air will reach the port 48, from the inlet valve 32, at substantially the same time that piston 5 closes said port, so that there is no loss of fuel, and substantially no foul gas left in the cylinder. In the further inward movement of the piston 5, the charge of fuel and air in cylinder 3 is compressed, say to a pressure of sixty five pounds per square inch, and at the completion of this inward stroke the charge is ignited by the ignition device 34, producing high pressure in cylinder 3, which drives the piston outward in the succeeding expansion stroke. During this stroke the inlet valve 32 is held closed by its spring 33 and by the pressure in the cylinder 3, and the supplementary exhaust valve 49 is held closed by pressure of its spring 50 and by the pressure in said cylinder.

By the opening of exhaust valve 49 during the first part of the inward stroke of the piston, the period of the exhaust is prolonged, so as to permit of a more effective scavenging action, and the influx of fresh mixture from the head end of the cylinder at this time further insures complete and positive scavenging. Moreover, the postponement of compression to half-stroke, or thereabout, results in decreasing the ratio of compression to the expansion in the next out-stroke, so that the burnt gases may be expanded substantially to atmospheric pressure, with resulting higher economy, as well as a comparatively noiseless exhaust. By this means I obviate the great waste of energy which is ordinarily incurred in the discharge of exhaust gases at high temperature and pressure, since the expansion of the burnt gases to substantially atmospheric pressure also reduces the temperature thereof, the heat of the gases being utilized in doing work.

In order to keep the temperature of the gases on compression thereof, from rising sufficiently high enough to cause premature ignition, water may be supplied to the partly compressed mixture as it passes through the supply pipe 27 and mixing chamber 29, by opening valve 45, allowing water to flow from the circulating water system of the engine, through pipe 38 to the contracted portion of the pipe 27, wherein the water is taken up by the mixture moving at high velocity.

The pressure in the storage chamber 30 is determined by properly proportioning the capacity of such chamber and its connections with relation to the capacity of the low-pressure cylinder chamber 9. I have found that by using a pressure of five pounds or so, per square inch, a positive scavenging effect is obtained, giving a full charge of clean mixture.

By provision of the automatic spring controlled valve 32, I am enabled to admit the fuel and air mixture at the head end of the cylinder, away from the exhaust port, and thereby obtain most effective scavenging and charging actions, without the use of special valve-operating cams or other mechanism for opening the valves at the proper time, the time of opening of the valve being controlled automatically by the pressure in the cylinder itself, as the valve will remain closed until this pressure is eliminated by opening of the exhaust port, at the end of the expansion stroke.

What I claim is:

1. An internal combustion engine comprising a main cylinder and piston, a low pressure cylinder and piston, said pistons being connected to operate simultaneously, means for admitting fuel and air to the low pressure cylinder, storage means for receiving compressed mixture of fuel and air from the low pressure cylinder, said main cylinder being provided with an exhaust port opened by the piston at the end of the expansion stroke, and with a supplementary exhaust port controlled by the movement of the piston to maintain an open exhaust during the first part of the compression stroke only, and valve means for admitting compressed mixture of fuel and air from said storage means to the main cylinder after the opening of the first named exhaust port and during the opening of the supplementary exhaust port.

2. An internal combustion engine comprising a main cylinder and piston, a low pressure cylinder and piston, said pistons being connected to operate simultaneously, means for admitting fuel and air to the low pressure cylinder, storage means for receiving compressed mixture of fuel and air from the low pressure cylinder, and an inlet valve means for the main cylinder communicating with the mixture storage means and opening under the pressure of the compressed mixture, to admit mixture to the main cylinder when the pressure in said cylinder is relieved, and said main cylinder being provided with an exhaust port opened by the piston to relieve the pressure therein at the end of the expansion stroke and with a supplementary exhaust port controlled by the movement of the piston to maintain an open exhaust during the first part of the compression stroke, and to close such supplementary exhaust during the expansion stroke.

3. An internal combustion engine comprising a main cylinder and a low pressure cylinder, pistons working in said cylinders and connected for simultaneous operation, valved inlet and outlet means for said low pressure cylinder, fuel and air supply means connected to the inlet means for the low pressure cylinder, a storage chamber connected to the outlet means of the low pressure cylinder, and a valved inlet means provided with a mixing device and connected with said storage chamber and with the main cylinder, to admit mixture to said cylinder from said storage means.

4. An internal combustion engine comprising a main cylinder, a low pressure cylinder, pistons working in said cylinders and connected for simultaneous operation, means for supplying fuel and air to the low pressure cylinder, a storage chamber connected to receive compressed mixture from the low pressure cylinder, said main cylinder being provided with an exhaust port opened by movement of the piston, and with an inlet valve connected with said storage chamber to admit air and fuel from said chamber to the main cylinder when the pressure in said cylinder falls on opening of said exhaust port, and said main cylinder being further provided with a supplementary exhaust port opened by movement of the piston, during the outer portion of the piston stroke, an engine-operated valve connected to said supplementary exhaust port, to shut off the exhaust through said port during the expansion stroke of the piston, and to open said exhaust during the first portion of the inward stroke of the piston.

5. An internal combustion engine comprising a main cylinder, a low pressure cylinder, pistons working in said cylinders and connected for simultaneous operation, means for supplying fuel and air to the low pressure cylinder, a storage chamber connected to receive compressed air and fuel mixture from said low pressure cylinder, a compression chamber, coöperating with the engine piston means for compressing air during the expansion stroke of the piston, said main cylinder being provided with an exhaust port and with a scavenging inlet port, opened by the piston at the end of its expansion stroke, said scavenging inlet port being connected to said compression chamber to supply air to the main cylinder for scavenging, when said exhaust port is open, and said main cylinder being further provided with a spring-controlled inlet valve connected with said storage chamber to supply air and fuel mixture to said cylinder when the pressure therein falls on opening of the said exhaust port, and said main cylinder being further provided with a supplementary exhaust port opened by the piston during the outer portion of its stroke, and an engine-operated valve connected to said supplementary exhaust port, to shut off the exhaust through said port during the expansion stroke of the piston, and to open said exhaust during the first portion of the inward stroke of the piston, so as to provide for compression only during a portion of the inward stroke.

6. In an internal combustion engine, the combination with a main cylinder and a low pressure cylinder, and with pistons working in said cylinders and connected for simultaneous operation, of means for supplying air and fuel to said low pressure cylinder, a storage chamber connected to said cylinder to receive compressed mixture of air and fuel therefrom, a circular mixing chamber, an inlet pipe therefor connected with said storage chamber and connected tangentially to said mixing chamber, and said mixing chamber having an axially extending contracted outlet, and a valve for controlling communication between said outlet and the main cylinder.

In testimony whereof I have hereunto set my hand, at Los Angeles, California, this 22nd day of June, 1914.

FRANK J. KIMBALL.

Witnesses:
C. E. ALLYN,
A. P. KNIGHT.